United States Patent [19]

Fukushima et al.

[11] Patent Number: 4,652,419

[45] Date of Patent: Mar. 24, 1987

[54] WIDE RANGE MONITOR APPARATUS FOR OUTPUT FROM NUCLEAR REACTOR

[75] Inventors: Toshiki Fukushima, Tokyo; Yorimasa Endo, Tokorozawa; Osamu Nishiyama, Tokyo, all of Japan

[73] Assignee: Kabushiki Kaisha Toshiba, Kawasaki, Japan

[21] Appl. No.: 655,447

[22] Filed: Sep. 28, 1984

[30] Foreign Application Priority Data

Sep. 30, 1983 [JP] Japan .................................. 58-180485
Mar. 5, 1984 [JP] Japan .................................. 59-40565

[51] Int. Cl.$^4$ ............................................. G21C 17/00
[52] U.S. Cl. ...................................... 376/254; 376/259
[58] Field of Search ................... 376/254, 255, 259; 250/369, 388, 390–392

[56] References Cited

U.S. PATENT DOCUMENTS

4,493,811 1/1985 Seki et al. ............................. 376/254
4,495,144 1/1985 Lingren et al. ........................ 376/259

FOREIGN PATENT DOCUMENTS

630539 3/1977 U.S.S.R. ............................. 376/259

*Primary Examiner*—Salvatore Cangialosi
*Attorney, Agent, or Firm*—Oblon, Fisher, Spivak, McClelland & Maier

[57] ABSTRACT

A wide range monitor apparatus for the output from a nuclear reactor has a logarithmic count rate measuring circuit and a Campbel measuring circuit corresponding to different neutron flux density ranges of the neutron flux output from a neutron detector. The apparatus monitors the nuclear reactor output as a single output which has a linearity with the neutron flux density over a wide range thereof. A logic circuit combines two comparison discrimination signals obtained by comparing low and high comparison voltages corresponding to the hysteresis width in an overlap region of the outputs from the two measuring circuits with detection output voltages from the two measuring circuits. One of the outputs from the two measuring circuits is selected in accordance with the logical level signal obtained by combining the two comparison discrimination signals by the logic circuit.

2 Claims, 11 Drawing Figures

F I G. 2
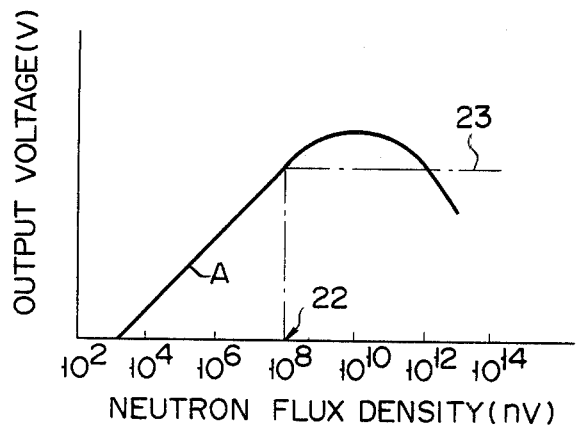
F I G. 3
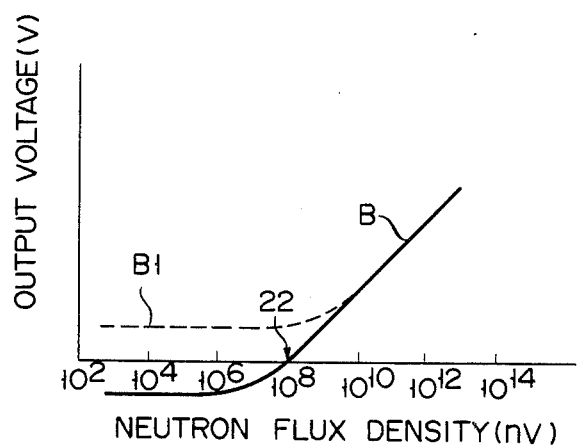
F I G. 4
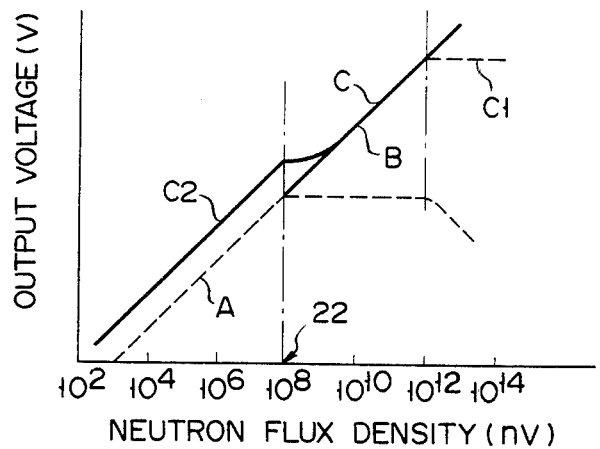

F I G. 5
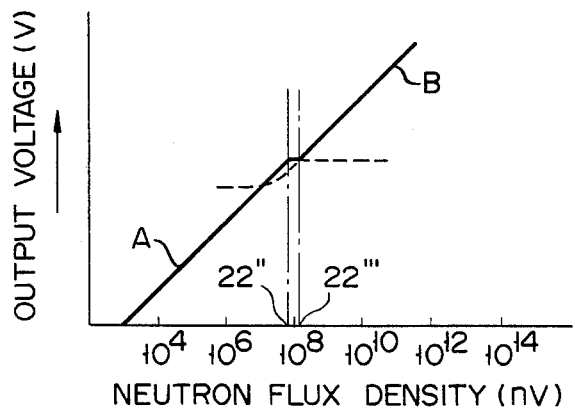
F I G. 6
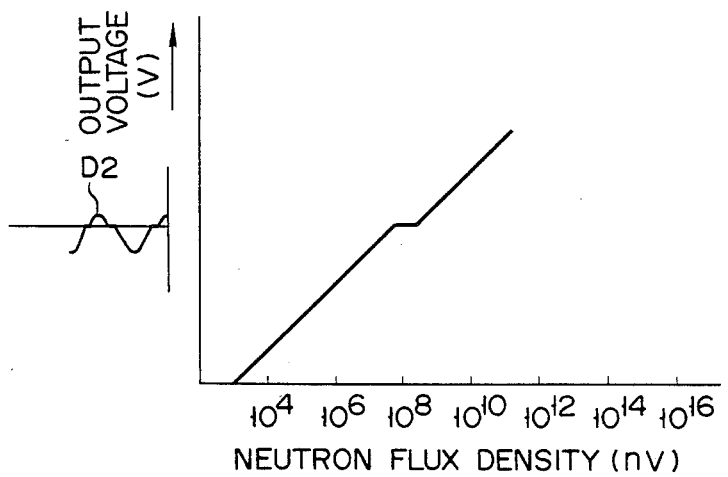
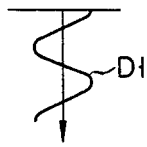

| | | V2 | V1 | | Vref2 | |
|---|---|---|---|---|---|---|
| FIRST COMPARATOR | RISE | 0 | 0 | 1 | | 0 |
| | FALL | 0 | 1 | 1 | | 0 |
| SECOND COMPARATOR | | 0 | 0 | 0 | 1 | |
| LOGIC OPERATION CIRCUIT | RISE | 0 | 0 | 1 | 1 | |
| | FALL | 0 | 1 | 1 | 1 | |

WIDE RANGE MONITOR APPARATUS FOR OUTPUT FROM NUCLEAR REACTOR

BACKGROUND OF THE INVENTION

The present invention relates to an apparatus for monitoring the output from a nuclear reactor used in a nuclear power plant and, more particularly, to a wide range monitor apparatus for the output from a nuclear reactor, which detects changes in neutron flux density nV which are caused by randomly occurring fission and which fall within a wide range of more than ten digits per flux, and which detects the output corresponding to the detection result.

The conventional monitor apparatus for output from a nuclear reactor must be able to monitor output from a nuclear reactor, i.e., the neutron flux density which changes over a wide range of more than ten digits per flux when the reactor is started or stopped. However, since such a monitor range is too wide, measuring over the entire range cannot be performed with a single monitor technique. In view of this, some monitor techniques having different monitor ranges are combined for monitoring the entire range. For example, in a BWR (Boiling Water Reactor) monitor system, the overall monitor range is divided into two ranges. A pulse counting technique is used for one of the two ranges, i.e., the low neutron flux density range. However, a Campbel measuring technique is used for the other of the two ranges, i.e., the high neutron flux density range. Thus, the overall range including the low and high output regions can be monitored.

Even if the neutron flux density changing within a wide range is detected by different measuring techniques, if monitoring can be performed with a single type of monitor apparatus including only one type of detector, the overall system of the nuclear reactor measuring equipment can be simplified. The operation can be facilitated, the running cost can be reduced, and the maintenance procedures can be simplified.

In view of this, there has been proposed a monitor apparatus including only one type of detector. The detector generates a single output signal proportional to a logarithm of a neutron flux density which changes over a wide range requiring the use of two different measuring techniques. An example of such an apparatus is a wide range monitor apparatus as disclosed in Japanese Patent Publication No. 48-18436, entitled, "Random Pulse Monitor Apparatus," corresponding to U.S. Pat. No. 3,579,127.

This random pulse monitor apparatus has the configuration shown in FIG. 1.

High voltage from a DC power source 14 is applied through an impedance element 15 between a pair of electrodes 12 and 13 of a nuclear fission ion chamber 11. The electrode 13 of the fission ion chamber 11 to which the impedance element 15 is connected supplies an ionized signal through a capacitor 16 to the input side of a broad-band amplifier 17. An amplified signal from the broad-band amplifier 17 is supplied to a logarithmic count rate channel 19 and a Campbel channel 20 through a cable 18. The logarithmic count rate channel 19 is for the low neutron flux density range obtained by dividing the entire monitor range into low and high neutron flux density ranges. The logarithmic count rate channel 19 consists of a high-pass filter amplifier 191 and a logarithmic count rate circuit 192. An input pulse signal amplified by the high-pass filter amplifier 191 is converted into a logarithm by the logarithmic count rate circuit 192. A signal is produced from the circuit 192 as an output from one channel which is proportional to the logarithm of the pulse count rate of the incident neutron flux density. The Campbel channel 20 corresponds to the high neutron flux density range and consists of a high-pass fitler amplifier 201, an average rectifier circuit 202, a logarithmic amplifier 203 for generating output proportional to the logarithm, and a differential amplifier 204. An input signal amplified by the high-pass filter amplifier 201 is detected by the average rectifier circuit 202 and is converted by the logarithmic amplifier 203 into a signal proportional to the logarithm of the incident neutron flux. The differential amplifier 204 calculates the difference between the signal from the amplifier 203 with a bias voltage 205 and produces the difference as an output of the other channel. Outputs from the respective channels are supplied to a coupler 21. The coupler 21 adjusts the input signals such that the output signals from the respective channels proportional to the logarithm of the neutron flux density are aligned, couples them and produces a single output. The coupler 21 clamps the output voltage of the logarithmic count rate channel which exceeds a predetermined output voltage at an output voltage corresponding to a predetermined logarithmic count rate (e.g., $10^8$ neutron flux density) within a region in a linear region in which the input/output characteristics of the logarithmic count rate channel and those of the Campbel channel overlap. The coupler 21 also adjusts the bias voltage 205 of the differential amplifier 204 of the Campbel channel for cutting off the output voltage below the predetermined logarithmic count rate. A sum of the output from the logarithmic count rate channel and that from the Campbel channel is obtained at a coupling point 211. The coupling point 211 then produces a single output voltage in which the outputs from the logarithmic count rate and Campbel channels are continuously coupled.

The operation of the conventional wide range monitor apparatus of the output of a nuclear reactor having the above configuration will be described below.

The DC component of the output from the nuclear fission ion chamber 11 is cut by the capacitor 16, and the remaining signal component is supplied to the logarithmic count rate channel 19 and the Campbel channel 20. The logarithmic count rate channel 19 produces a signal proportional to the logarithm of the neutron flux density until it reaches the neutron flux density value $10^8$ indicated by 22 in FIG. 2. When the density exceeds the value $10^8$, the output voltage is decreased due to the influence of the pulse resolution counting loss of the nuclear fission chamber 11. Thus, the higher the neutron flux density value, the greater the decrease in the output voltage, thus providing the characteristics shown by curve A in FIG. 2.

The output from the Campbel channel 20 can be proportional to the logarithm of the neutron flux density value within the range above a predetermined value, for example, the neutron flux density value $10^8$ indicated by 22 in FIG. 3. When the density is below $10^8$, the output voltage does not become proportional to the neutron flux density due to circuit noise or background radiation noise, thereby providing the characteristics as indicated by curve B in FIG. 2.

The outputs from the logarithmic count rate channel 19 and the Campbel channel 20 are added, and are coupled by the coupler 21 when the neutron flux density exceeds $10^8$. The coupled output voltage has the characteristics indicated by line C in FIG. 2.

However, since the output voltages from the logarithmic count rate channel 19 and the Campbel channel 20 are simply added together in the conventional random pulse monitor apparatus as described above, various problems are encountered.

First, when the output from the logarithmic count rate channel 19 is below $10^8$, the corresponding output voltage draws closer to the saturation region due to the resolution count loss of the nuclear fission chamber. However, when this output from the channel 19 exceeds $10^8$, the corresponding output voltage is decreased. When the output voltage decreases below the clamp level indicated by 23 in FIG. 2, the clamp function cannot be provided. As a result, the output voltage obtained from the coupling point 211 has a portion in which the relationship between the output voltage and the neutron flux density is not linear and is generated since the output from the logarithmic count rate channel is decreased even if the output from the Campbel channel is increased, as indicated by the dotted line C1 in FIG. 4. Thus, the output from the nuclear reactor cannot be correctly monitored.

Second, when the nuclear reactor which has been operating at the rated output stops operating, the neutron flux density abruptly decreases immediately after the stop timing. However, noise is thereafter generated due to residual background γ-rays. Then, the output from the Campbel channel 20 does not decrease below a certain value corresponding to the predetermined neutron flux density, as indicated by curve B1 in FIG. 3. This influence appears in the output from the coupling point 211. The output voltage vs. predetermined neutron flux density characteristic curve does not have the linear relationship as indicated by C2 in FIG. 4 at the coupling point 211 of the outputs from the Campbel channel 20 and the logarithmic count rate channel 19.

Third, when the nuclear reactor is started, the density of the generated neutron flux is increased at a predetermined rate. However, when the rate changes abruptly, the normal operation of the nuclear reactor is prevented. In view of this problem, a protective measure is taken in which the neutron flux density is periodically monitored and the operation of the nuclear reactor is stopped when a detected change in the neutron flux density exceeds a predetermined value. However, in the conventional apparatus, the output voltage corresponding to the critical neutron flux density $10^8$ at which the outputs from the logarithmic count rate channel 19 and the Campbel channel 20 are switched is preferably kept constant. However, as shown in FIG. 5, the neutron flux density for limiting the output voltage of the logarithmic count rate channel at a clamp level may take a slightly lower value as indicated by 22″ and may deviate from the neutron flux density $10^8$ due to the drift of the adjusting point over time or the like. This neutron flux density may also be higher than the density $10^8$. Similarly, the neutron flux density for cutting off the output voltage from the Campbel channel 20 may be slightly higher by 22‴ and may deviate from the density $10^8$, or may also be slightly lower. In this manner, when a clamp level corresponding to a predetermined neutron flux density deviates due to a drift over time, the output voltage may not be proportional to the logarithm of the neutron flux density at the coupling point 211. In this case, even if the neutron flux density increases, while it is within the range between 22″ and 22‴, the periodic monitor output indicates that the neutron flux density has not changed even if the rate of change of the output from the nuclear reactor is constant. When the neutron flux density is 22″ or 22‴ even if the rate of increase in the output from the nuclear reactor stays at a predetermined rate, the periodic monitor output changes as if the neutron flux density has abruptly changed. When such an output deviation occurs, if the output from the nuclear reactor has a region D1 of slow change in the vicinity of a predetermined neutron flux density, the above-mentioned proportional relationship cannot be maintained. Therefore, the output voltage does not precisely follow the change in neutron flux density as indicated by D2 in FIG. 6.

SUMMARY OF THE INVENTION

It is an object of the present invention to provide a wide range monitor apparatus for output from a nuclear reactor, which is free from the above drawbacks of the prior art apparatuses, which is a single monitor apparatus having only a single detector, and which is capable of obtaining a single continuous output voltage over a wide neutron flux density range of ten digits by switching a logarithmic count rate measuring circuit, a Campbel measuring circuit corresponding to a monitor range of a logarithmic count rate channel, and by switching a Campbel channel so that the corresponding output voltages have hysteresis characteristics.

It is another object of the present invention to prevent the adverse effects of fluctuations in output voltage from a nuclear reactor when the logarithmic count rate measuring circuit is switched to the Campbel measuring circuit or vice versa.

In order to achieve this object of the present invention, there is provided a wide range monitor apparatus for output from a nuclear reactor comprising: a neutron detector means for detecting the output from the nuclear reactor as a neutron output; a logarithmic count rate measuring circuit means, connected to said neutron detector means, for measuring within a predetermined neutron flux density range and for generating a linear output voltage proportional to a logarithm of the measured neutron flux density; a Campbel measuring circuit means, connected to said neutron detector means, for measuring in a neutron flux density range exceeding the predetermined neutron flux range and for generating a linear output voltage proportional to a logarithm of the measured neutron flux density; a first comparator means, connected to said logarithmic count rate measuring circuit means, having a first comparison reference voltage corresponding to a predetermined neutron flux density at which the linear output voltages from said logarithmic count rate measuring circuit means and said Campbel measuring circuit means overlap each other, and having first and second comparison voltages which are based on the first comparison reference voltage and which are set to be higher and lower, respectively, than the first comparison reference voltage to compare an input voltage with the first comparison voltage when the input voltage is increasing or to compare the input voltage with the second comparison voltage when the input voltage is decreasing, and to generate a first comparison discrimination signal, the difference between the first and second comparison voltages determining the hysteresis width; a second comparator means, connected to said Campbel measuring circuit, for comparing the voltage based on a second comparison reference voltage corresponding to a neutron flux density which is larger than the predetermined neutron flux density and for producing a second comparison discrimination signal; a logic circuit means for calculating an OR product of the first and second comparison discrimination signals and for producing a switching signal; and a switching means, connected to said logic circuit means and responsive to the switching signal, for supplying an output from said logarithmic count rate measuring circuit means to an output side or for supplying an output from said Campbel measuring circuit means to the output side.

Since the wide range monitor apparatus for monitoring output from a nuclear reactor according to the present invention has the above configuration, when a switch is made from an output voltage from the logarithmic count rate measuring circuit based upon detection of a neutron flux within a predetermined range to the Campbel measuring circuit for generating an output voltage which is linear to the neutron flux density within a neutron flux density range exceeding the predetermined neutron flux density, the output from the logarithmic count rate measuring circuit is completely cut off. For this reason, the linearity of the output voltage can not be interfered with by the output from the logarithmic count rate measuring circuit which has been decreased below the clamp level.

The output voltage from the logarithmic count rate measuring circuit is compared with one of the comparison voltages which are based on a first comparison reference voltage corresponding to a predetermined neutron flux density and which have a difference corresponding to the hysteresis width. Therefore, even if changes in the nuclear reactor output are slow and include considerable jitter, switching between outputs from the logarithmic count rate measuring circuit and the Campbel measuring circuit can be performed reliably. Even if the nuclear reactor output includes noise due to background γ-rays of a high level after the nuclear reactor is stopped, a switch can be made from the Campbel measuring circuit to the logarithmic count rate measuring circuit. Therefore, linear output voltages can be constantly monitored.

Even if a predetermined neutron flux density corresponding to a switching point from the output voltage from the logarithmic count rate measuring circuit to that from the Campbel measuring circuit or vice versa is deviated from a prescribed value, the linearity of the output voltage will not be impaired even with slow changes in the nuclear reactor output as long as the respective output voltages fall within the precision of the nuclear reactor output.

During the switching operation of the measuring systems, the input for a periodical monitor is supplied to another system for a predetermined period of time. Therefore, an increase in the nuclear reactor output can be monitored with higher reliability.

BRIEF DESCRIPTION OF THE DRAWINGS

FIG. 2 is a graph showing the relationship between a neutron flux density and a corresponding output voltage from a logarithmic count rate channel in the circuit configuration shown in FIG. 1;

FIG. 3 is a graph showing the relationship between a neutron flux density and a corresponding output voltage from a Campbel channel in the circuit configuration shown in FIG. 1;

FIG. 4 is a graph showing the relationship between an output voltage and a neutron flux density when outputs from the logarithmic count rate channel and the Campbel channel shown in FIGS. 2 and 3 are coupled, while maintaining the linearity between the output voltage and the neutron flux density;

FIG. 5 is a graph showing the relationship between an output voltage and a neutron flux density in a conventional random pulse monitor apparatus when the linear relationship therebetween cannot be maintained;

FIG. 6 is a graph showing the relationship between an output voltage and a neutron flux density when the nuclear reactor output fluctuates slightly in the vicinity of a predetermined neutron flux density;

DETAILED DESCRIPTION OF THE PREFERRED EMBODIMENTS

An embodiment of the present invention will be described with reference to FIGS. 7, 8, 10 and 11.

Figure 1:
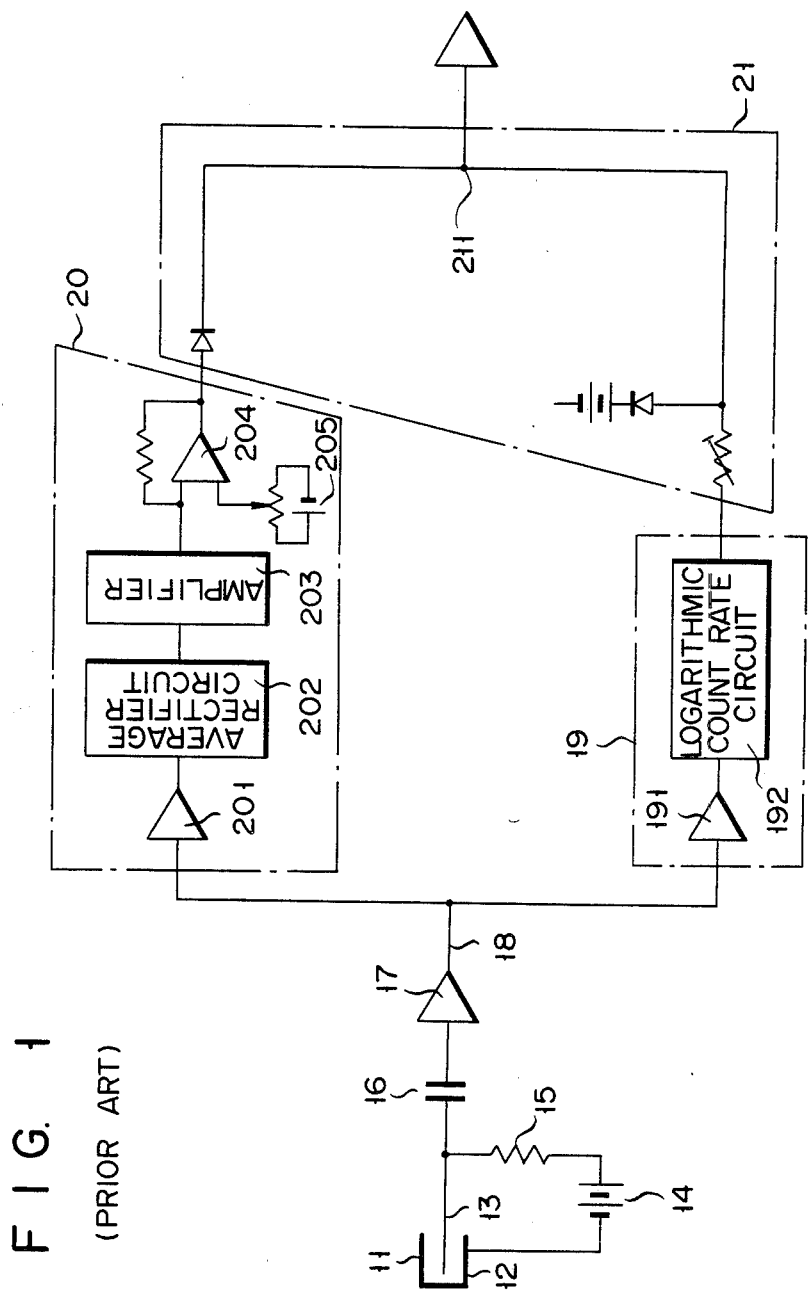
FIG. 1 is a block circuit diagram showing the circuit configuration of a conventional random pulse monitor apparatus.
Figure 7:
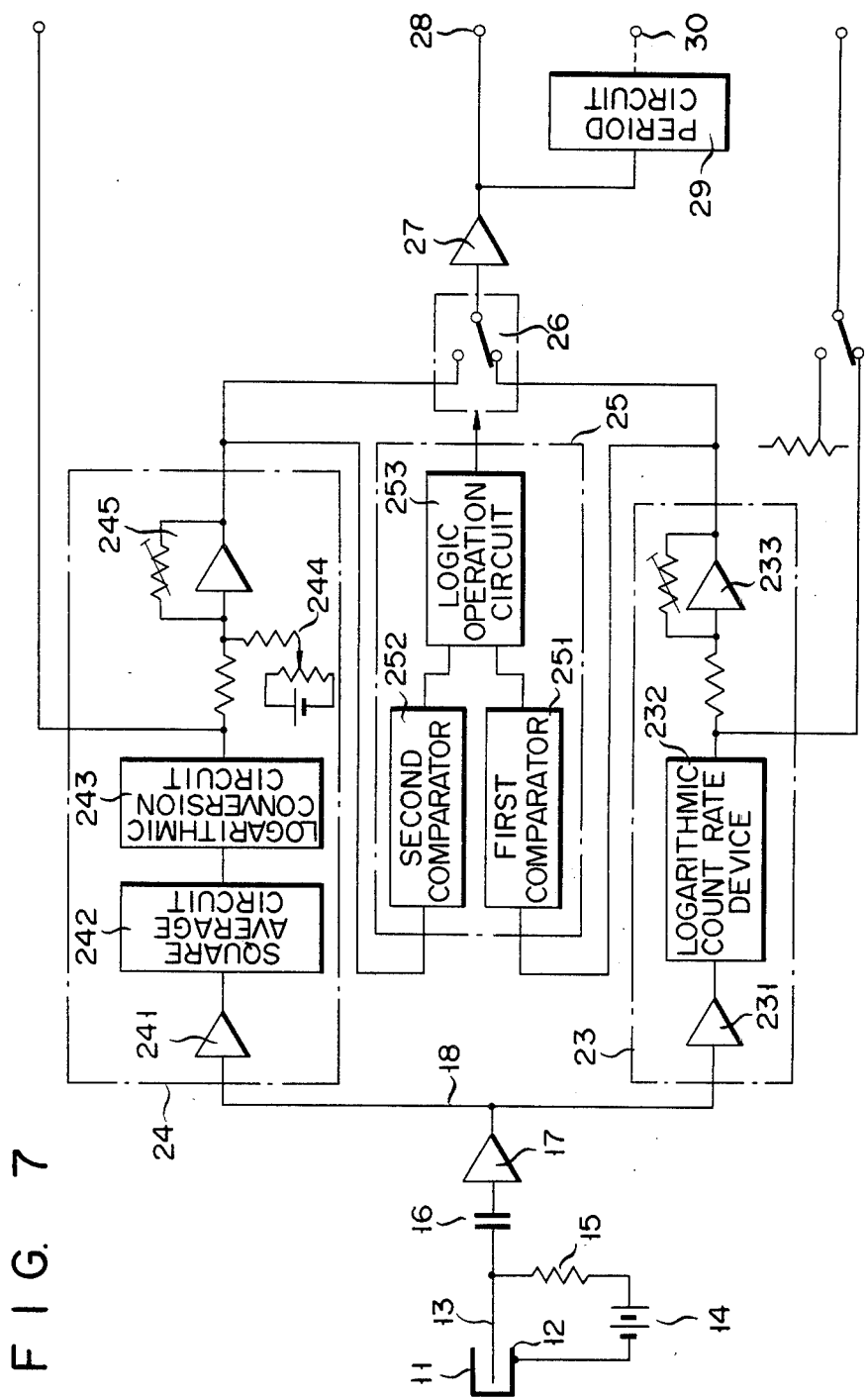
FIG. 7 is a block circuit diagram according to an embodiment of the present invention.

Referring to FIG. 7, a high voltage from a DC power source 14 is applied to an anode 13 and a cathode 12 of a neutron flux detector 11 for detecting a neutron flux from a nuclear reactor through an impedance element 15. A signal of the neutron detector 11 appearing at the impedance element 15 is supplied to a broad-band amplifier 17 through a capacitor 16 for cutting off the DC component. The output of the broad-band amplifier 17 is connected through a cable 18 to a logarithmic count rate measuring circuit 23 and a Campbel measuring circuit 24 which respectively correspond to low and high monitor ranges obtained by dividing the entire monitor range into two ranges. The broad-band amplifier 17 amplifies output from the neutron flux detector 11 and supplies the amplified signal to the circuits 23 and 24.

The logarithmic count rate measuring circuit 23 consists of a pulse amplifier 231 for amplifying output from the broad-band amplifier 17, a logarithmic count rate device 232 for receiving output from the pulse amplifier 231 and for producing an output proportional to the logarithm of the input signal, and a variable gain amplifier 233 for amplifying output from the logarithmic count rate device 232 and for producing the amplified signal as an output from the circuit 23.

The logarithmic count rate measuring circuit 23 has an output voltage corresponding to the input neutron flux density and having a characteristic curve similar to curve A shown in FIG. 2 of the conventional apparatus. The logarithmic count rate measuring circuit 23 monitors within the low monitor range below the level indicated by reference numeral 22. The logarithmic count rate measuring circuit 23 adjusts the gain of the variable gain amplifier 233 so that the input/output characteristics are on a line proportional to the logarithm.

The Campbel measuring circuit 24 monitors in the high monitor range above the neutron flux density 22 shown in FIG. 3. The Campbel measuring circuit 24 consists of a high-pass filter amplifier 241 for amplifying only the high-frequency components of the output from the broad-band amplifier 17, a square average circuit 242 which receives output from the high-pass filter amplifier 241 and for producing the square average of the input, a logarithmic conversion circuit 243 which receives output from the square average circuit 242 and for calculating a logarithm of the input, a shift circuit 244 for shifting the output level from the logarithmic conversion circuit 243, and a variable gain DC amplifier 245 for amplifying the level-shifted logarithmic signal. The output from the variable gain DC amplifier 245 has a characteristic curve similar to curve B of the conventional apparatus shown in FIG. 2. This characteristic curve is shifted vertically parallel to the Y-axis by the shift circuit 244. The slope of the line of the output voltage vs. the neutron flux density of the Campbel measuring circuit 24 is varied by the variable gain DC amplifier 245. The outputs from the logarithmic count rate channel and the Campbel channel are coupled to provide a linear relationship.

A switching discrimination circuit 25 has a first comparator 251 and a second comparator 252. The first comparator 251 compares output from the logarithmic count rate measuring circuit 23 with a prospective comparison voltage and produces a first comparison discrimination signal. The second comparator 252 compares output from the Campbel measuring circuit 24 with a prospective comparison voltage and produces a second comparison discrimination signal. The switching discrimination circuit 25 has a logic operation circuit 253 as a gate circuit. The logic operation circuit 253 "ORs" the first and second comparison discrimination signals and supplies a switching signal to a switching circuit 26.

The first comparator 251 is a hysteresis-type comparator. The first comparator 251 receives a first comparison reference voltage Vref1, and based thereon produces a first comparison voltage V1 slightly higher than the first comparison reference voltage Vref1, and produces a second comparison voltage V2 slightly lower than the first comparison reference voltage Vref1. The first comparison reference voltage Vref is set to be equal to the output voltage from the logarithmic count rate measuring circuit 23 at the neutron flux density $10^8$. The first comparator 251 compares the output from the logarithmic count rate measuring circuit 23 with these first and second comparison voltages V1 and V2. The difference between the first and second comparison voltages V1 and V2 corresponds to the hysteresis width. In many cases, the voltage obtained by adding a voltage one-half the hysteresis width to the second comparison voltage V2 is the first comparison reference voltage Vref1. In other words, an intermediate value between the first and second comparison voltages V1 and V2 is frequently the first comparison reference voltage Vref1, and can be adjusted.

If the output from the logarithmic count rate measuring circuit 23 is increasing, the first comparator 251 produces a first comparison discrimination signal of "1" level when the input signal voltage exceeds the first comparison voltage V1. The first comparator 251 produces a first comparison discrimination signal of "0" level when the input signal is below the comparison voltage V1.

When the output voltage from the logarithmic count rate measuring circuit 23 is decreasing, the second comparison discrimination voltage is kept at "1" level while the input signal is above the second comparison voltage V2 and the second comparison voltage is kept at "0" level while the input signal is below the second comparison voltage V2.

The second comparator 252 has a similar construction and receives a second comparison reference voltage Vref2 equal to the output voltage from the Campbel measuring circuit 24 at a neutron flux density higher than $10^8$, for example, at $10^{12}$. Comparison voltages for changing the comparison voltages in accordance with an increase or decrease in the output from the Campbel measuring circuit 24 are set above and below the second comparison reference voltage Vref2. However, since this is not particularly associated with the gist of the present invention, only the following definition will be given. That is, when the input signal is above the second comparison reference value Vref2, the second comparator 252 produces a second comparison discrimination signal of "1" level. However, when the input signal is below the second comparison reference voltage Vref2, the comparator 252 produces a second comparison discrimination signal of "0" level. The second comparator 252 discriminates whether the output from the logarithmic count rate measuring circuit 23 has exceeded the neutron flux density $10^8$ to cause a decrease in the output voltage and the neutron flux density has reached a value corresponding to an output for producing the first comparison reference voltage, or whether the input signal is compared with the first comparison reference voltage in the low monitor range.

The switching circuit 26 switches in response to the switching signal from the switching discrimination circuit 25. The switching circuit 26 receives an output from the logarithmic count rate measuring circuit 23 at its first input terminal and an output signal from the Campbel measuring circuit 24 at its second input terminal. When the switching signal of "0" level is supplied, the switching circuit 26 switches the first input terminal to the output terminal. When the switching signal of "1" level is supplied, the switching circuit 26 switches the second input terminal to the output terminal.

A DC amplifier 27 has its input terminal connected to the switching circuit 26, and its output terminal connected to a wide range monitor output terminal 28 and a period circuit 29. The DC amplifier 27 supplies an output signal from the period circuit 29 to a period output terminal 30.

The above circuit configuration will be described with reference to FIGS. 10 and 11.

The logarithmic count rate measuring circuit 23 produces a signal proportional to the logarithm of the neutron flux density of $10^3$ to $10^9$. When the neutron flux density exceeds $10^9$, the influence of the pulse count resolution loss of the neutron flux detector appears. Then, a signal is produced having characteristics which are not proportional to the logarithm of the density, and it is saturated at a predetermined neutron flux density and is decreased thereafter. Refer to curve E1 in FIG. 10.

The Campbel measuring circuit 24 has an input/output characteristic curve to which a signal corresponds to a neutron flux density, which is not proportional to the logarithm of the neutron flux density below the neutron flux density of $10^{7.5}$, and which is proportional to the logarithm of the neutron flux density at a neutron flux density higher than $10^{7.5}$. Refer to line E2 in FIG. 10.

In the logarithmic count rate measuring circuit 23, the gain of the variable gain amplifier 233 is adjusted such that the curve and line draw a continuous line proportional to the logarithm of the neutron flux density. In the Campbel measuring circuit 24, the shift level of the shift circuit 244 and the gain of the variable gain DC amplifier 245 are adjusted. However, in this embodiment, the neutron flux density region of $10^{7.5}$ to $10^9$ of the input/output characteristics of the Campbel measuring circuit 24 and the neutron flux density region of $10^{7.5}$ to $10^9$ of the input/output characteristics of the logarithmic count rate measuring circuit 23 overlap in the range of $10^{7.5}$ to $10^9$.

Output voltages from the Campbel and logarithmic count rate measuring circuits which partially overlap at the linear portion thereof are supplied to the switching discrimination circuit 25 and the switching circuit 26.

In a low neutron flux density region, i.e., in a neutron flux density of about $10^6$, the output from the logarithmic count rate measuring circuit 23 is lower than the comparison reference voltage Vref1 from the first comparator 251 and the comparison reference voltage Vref2 from the second comparator 252. Therefore, the first and second comparison discrimination signals from the first and second comparators 251 and 252 are both at "0" level. Therefore, a switching signal of "0" level is supplied from the operation circuit 253 to the first input terminal of the switching circuit 26. The output from the logarithmic count rate measuring circuit 23 is supplied to the DC amplifier 27.

As the neutron flux density increases, the corresponding output voltage increases. Even if the output voltage exceeds the comparison voltage V2 of the first comparator 251, the comparison voltage of the comparator 251 remains as V1 and the output from the logarithmic count rate measuring circuit 23 is selected.

When the neutron flux is further increased and the corresponding output voltage exceeds the comparison voltage V1, the first comparison discrimination signal from the first comparator 251 goes to "1" level. Since the second comparison discrimination signal is "0" level, the operation circuit 253 produces a switching signal of "1" level. Then, the output from the Campbel measuring circuit 24 is supplied to the second input terminal of the switching circuit 26, and the output from the Campbel measuring circuit 24 is selected.

When the neutron flux density is further increased and exceeds the second comparison reference voltage Vref2, the second comparison discrimination signal of the second comparator 252 goes to "1" level. The Campbel measuring circuit 24 is selected irrespective of the level of the first comparison discrimination signal from the first comparator 251.

When the neutron flux density is decreased from a high region to, for example, $10^{12}$ or more, the output voltage is larger than the corresponding second comparison reference voltage Vref2. Therefore, the output from the Campbel measuring circuit is selected.

As the neutron flux density is decreased, when the output voltage becomes lower than the second comparison reference voltage Vref2, the second comparison discrimination signal goes to "0" level. However, since the output from the logarithmic count rate measuring circuit 23 is larger than the first and second comparison voltages V1 and V2, the first comparison discrimination signal goes to "1" level. Thus, the Campbel measuring circuit 24 remains selected.

When the neutron flux density is decreased further and corresponds to a voltage below the first comparison voltage V1, the first comparison discrimination signal remains at "1" level. Therefore, the Campbel measuring circuit 24 remains selected.

The first comparison discrimination signal goes to "0" level when the neutron flex density has decreased below a value corresponding to the second comparison voltage V2. Since the second comparison discrimination signal is also at "0" level, the switching circuit 26 switches the second to first input terminal and an output from the logarithmic count rate measuring circuit 23 is selected.

Figure 8:
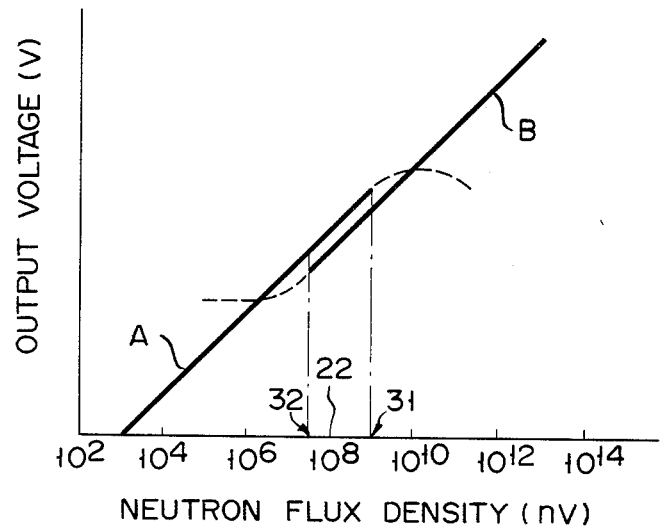
FIG. 8 is a graph showing an output voltage and a neutron flux density obtained with the wide range monitor apparatus of an output from a nuclear reactor according to the present invention.
Figures 10, 11:
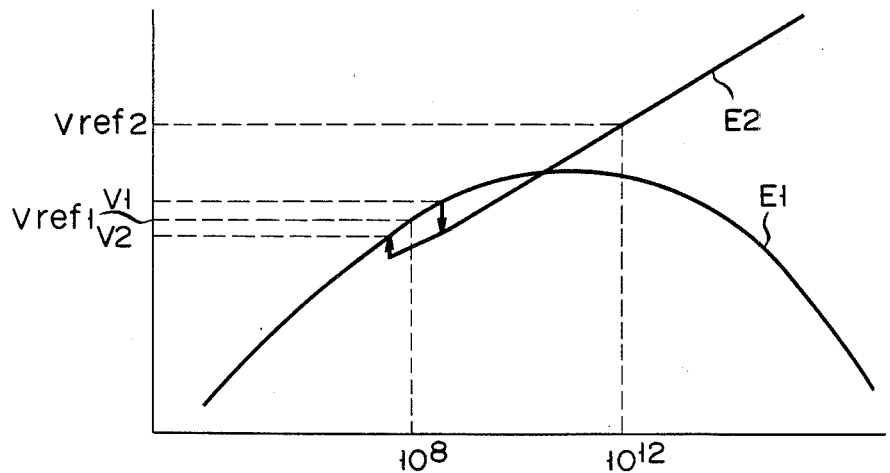
FIG. 10 is a graph showing the relationship between comparison voltages and output voltages corresponding to the neutron flux density obtained by the wide range monitor apparatus of an output from a nuclear reactor according to the present invention.
FIG. 11 is a table explaining output levels from respective portions of a switching discrimination circuit 25.

The output from the first comparator 251 of the switching discrimination circuit 25 has hysteresis characteristics, as shown in FIGS. 8 and 10. The comparison discrimination signal from the first comparator 251 changes from the neutron flux density $10^8$ in accordance with the output voltage corresponding to the neutron flux density which determines the hysteresis width. If the switching discrimination circuit 25 exhibiting the hysteresis characteristics is used, when the output from the nuclear reactor is slowly fluctuating in the vicinity of the neutron flux density $10^8$ and when the fluctuation range of the neutron flux density is narrower than the hyteresis width of the neutron flux density, such a fluctuation in the neutron flux density is absorbed and the frequent switching of the measuring systems can be prevented.

An output which is linear and continuous within a range of ten digits and which is proportional to the logarithm of the neutron flux density is produced from the switching circuit. The logarithmic count rate measuring circuit 23 monitors a nuclear reactor output within a region between $10^8$, with the value indicated by reference numeral 31 in FIG. 8, and within the region below the value indicated by reference numeral 32 in FIG. 8. The Campbel measuring circuit 24 monitors nuclear reactor output within the region above the value indicated by reference numeral 31, and within the region between the value indicated by reference numeral 32 and $10^8$.

Figure 9:
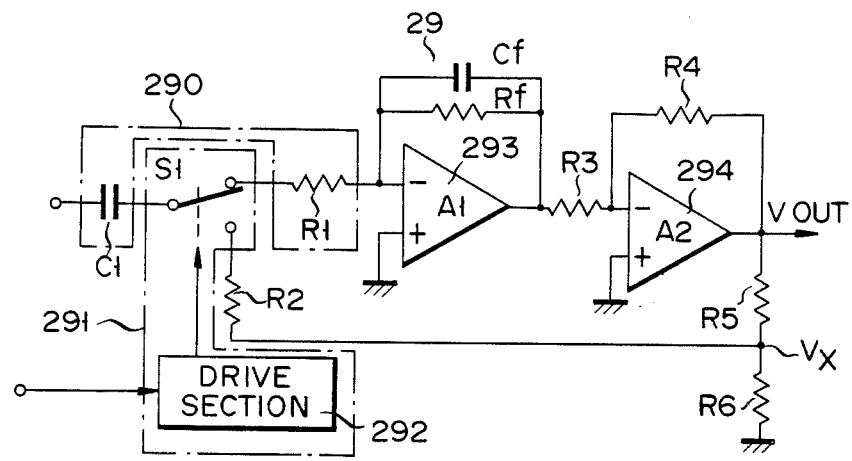
FIG. 9 is a circuit diagram showing a period circuit 29 in the circuit configuration according to the embodiment shown in FIG. 7.

As shown in FIG. 9, the period circuit 29 consists of a period differentiation circuit 290, a switching circuit 291, a drive section 292 for switching the switching circuit 291, a period integration circuit 293, and an amplifying circuit 294. The input terminal of the switching circuit 291 is connected to the input terminal of the period circuit 29 through a capacitor C1. One of a pair of output terminals of the switching circuit 291 is connected to a resistor R1, and the other output terminal is connected to a resistor R2. The switching circuit 291 is operated such that the input terminal is temporarily switched from the resistor R1 side to the resistor R2 side and is thereafter returned to the resistor R1 side. The capacitor C1 and the resistor R1 constitute the period differentiation circuit 290. The period differentiation circuit 290 differentiates at a time constant T0 (e.g., 2 sec) which is determined by the capaictor C1 and the resistor R1. When a switching operation is performed, no input is supplied to the period circuit 29 and the capacitor C1 is charged by an input signal received after the switching operation. An operational amplifier A1 of the period integration circuit 293 receives at its inverting input terminal an output from the switching circuit 291 through the resistor R1, and has its noninverting input terminal grounded. A parallel circuit consisting of a resistor Rf and a capacitor Cf is connected between the inverting input terminal and the output terminal of the operational amplifier A1. The operational amplifier A1 produces a component signal which is obtained by removing a noise component from the period signal. When the switching circuit 291 switches the input signal to the resistor R2 side, the operational amplifier A1 holds an input signal immediately before the switching operation at a time constant T1 (2 sec) which is determined by the resistor Rf and the capacitor Cf.

An operational amplifier A2 of the amplifying circuit 294 has its noninverting input terminal grounded and receives at an inverting input terminal an output signal received from the integration circuit 293 through a resistor R3. A resistor R4 for feedback is connected between the inverting input terminal and the output terminal of the amplifier A2, and a series circuit of resistors R5 and R6 is connected between the ground and the output terminal thereof. The node between the resistors R5 and R6 is connected to the end of the resistor R2 (opposite to the switching circuit side). The capacitor C1 is charged at a time constant T2 (e.g., 10 msec) which is determined by the capacitor C1 and resistance (R2+(R5×R6)/(R5+R6)). The time constant T1 (=T0) is set to be smaller than T2.

The mode of operation of the circuit of the configuration described above is described below.

The neutron flux density detection signal from the switching discrimination circuit 25 is supplied to the DC amplifier 27 and the period circuit 29, and is produced from the output terminal 28 via the output side of the DC amplifier 27 as a wide range monitor signal. Meanwhile, the signal supplied to the period circuit 29 is differentiated by the time constant T0 (e.g., 2 sec) determined by the capacitor C1 and the resistor R1. The differentiated signal is supplied to the input side of the operation amplifier A1 by the feedback operation of the capacitor Cf and the resistor Rf. The noise component of high frequency is removed from the input signal by the integration in the integration circuit at the time constant T1 (e.g., 2 sec) determined by the capacitor Cf and the resistor Rf. The noise-removed signal is then supplied to the amplifying circuit. The amplifying circuit produces a period signal of the period circuit.

When a switch is made from the logarithmic count rate measuring circuit 23 to the Campbel measuring circuit 24 or vice versa, the switching circuit 291 is switched to the resistor R2 side temporarily, for example, 100 msec in synchronism with the switching timing of the switching circuit 26 in response to the signal from the switching discrimination circuit 25.

When the switching circuit 291 is switched, the output from the integration circuit 293 is held at the time constant T1 determined by the resistor Rf and the capacitor Cf, and appears as a voltage having a value Vx which is the same as the input signal immediately before the switching operation. At this time, the input signal (output from the Campbel or logarithmic count rate measuring circuit) flows through the capacitor C1, the resistor R2, the resistor R5 and the resistor R6. The time constant T2 of the capacitor C1 and the resistance (R2+(R5×R6)/(R5+R6)) is determined to be about 10 msec which is shorter than 100 msec when the switching circuit 291 is switched. Therefore, a voltage obtained by subtracting Vx from the input signal is charged on the capacitor C1. Thereafter, the input signal is stabilized and is no longer charged on the capacitor.

When a time interval of 100 msec has elapsed since the switching operation, the drive section 292 switches the switching circuit 291 to the resistor R1 side. Since the input to the integration circuit 293 is adjusted to be the same as Vx, the periodic monitor of the input signal is performed irrespective of fluctuations in the output upon a switching operation.

As a result, when a switch is made from the Campbel measuring circuit to the logarithmic count rate measuring circuit or vice versa, even if the input signal to the period circuit has a transient change due to the difference between the output levels from the Campbel and logarithmic count rate measuring circuits, no input signal is supplied through the switching circuit. Since the time constant of the integration circuit is long enough, during the switching width of 100 msec, the output is held and the capacitor C1 is charged by the input signal after the switching operation. Therefore, the output signal from the period circuit is not subject to adverse transient influence due to the level difference between the measuring circuits. Even if there is a level difference between the outputs from the Campbel and logarithmic count rate measuring circuits, the output value from the period circuit immediately before the period circuit is held, and the periodic monitoring is reset during the hold period. Therefore, the output signal from the period circuit will not change abruptly.

According to the present invention, when a change is made from the output from the logarithmic count rate measuring circuit to that from the Campbel measuring circuit, even if a transient phenomenon occurs in the input signal to the period circuit after the switching operation due to the level difference between the outputs from the measuring circuits, the input signal immediately before the switching operation is held to provide an output from the period circuit. The output level from the period circuit immediately before the switching circuit is provided as a monitor start voltage and the period of the input signal of the measuring system after the switching operation is calculated. Accordingly, the output from the period circuit will not experience a fluctuation upon a switching operation from one measuring circuit to another.

What is claimed is:

1. A wide range monitor apparatus for an output from a nuclear reactor, comprising:
neutron detector means for detecting the output from the nuclear reactor as a neutron output;
logarithmic count rate measuring circuit means, connected to said neutron detector means, for measuring in a predetermined neutron flux density range and for generating a linear output voltage proportional to a logarithm of the measured neutron flux density;
Campbel measuring circuit means, connected to said neutron detector means, for measuring in a neutron flux density range exceeding the predetermined neutron flux range and for generating a linear output voltage proportional to a logarithm of the measured neutron flux density;

first comparator means, connected to said logarithmic count rate measuring circuit means and having a first comparison reference voltage corresponding to a predetermined neutron flux density at which the linear output voltages from said logarithmic count rate measuring circuit means and said Campbel measuring circuit means overlap each other, and first and second comparison voltages which are determined based on the first comparison reference voltage and are set to be higher and lower, respectively, than the first comparison reference voltage, for comparing an input voltage with the first comparison voltage when the input voltage is increasing or for comparing the input voltage with the second comparison voltage when the input voltage is decreasing, and for generating a first comparison discrimination signal, a difference between the first and second comparison voltages determining hysteresis width;

second comparator means, connected to said Campbel measuring circuit, for comparing a voltage determined based on a second comparison reference voltage corresponding to a neutron flux density larger than the predetermined neutron flux density and for producing a second comparison discrimination signal;

logic circuit means for calculating an OR product of the first and second comparison discrimination signals and for producing a switching signal; and switching means, connected to said logic circuit means and responsive to the switching signal, for supplying an output from said logarithmic count rate measuring circuit means to an output side or an output from said Campbel measuring circuit means to the output side.

2. An apparatus according to claim 1, which further comprises a differentiation circuit consisting of a capacitor and a resistor for producing a period signal of an output signal from said switching means; an integration circuit for integrating the period signal and for holding an output signal immediately before a switching operation of said switching means and for producing the held signal; means for dividing the period signal from said integration circuit; and means, responsive to a fluctuation in the switching signal, for temporarily cutting off an input signal to said integration circuit and for charging on said capacitor a voltage corresponding to a difference between an input signal to said differentiation circuit and the divided signal at a value shorter than a time constant of said differentiation circuit.

* * * * *